US011407305B2

(12) United States Patent
Beck

(10) Patent No.: US 11,407,305 B2
(45) Date of Patent: Aug. 9, 2022

(54) TANK FLAP OR CHARGING FLAP ARRANGEMENT

(71) Applicant: ILLINOIS TOOL WORKS INC., Glenview, IL (US)

(72) Inventor: Christian Beck, Röttingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 966 days.

(21) Appl. No.: 16/091,620

(22) PCT Filed: Apr. 11, 2017

(86) PCT No.: PCT/US2017/026899
§ 371 (c)(1),
(2) Date: Oct. 5, 2018

(87) PCT Pub. No.: WO2017/184376
PCT Pub. Date: Oct. 26, 2017

(65) Prior Publication Data
US 2019/0118644 A1  Apr. 25, 2019

(30) Foreign Application Priority Data

Apr. 18, 2016 (DE) ...................... 10 2016 107 094.7

(51) Int. Cl.
*B60K 15/05* (2006.01)
(52) U.S. Cl.
CPC ........ *B60K 15/05* (2013.01); *B60K 2015/053* (2013.01); *B60K 2015/0523* (2013.01); *B60K 2015/0576* (2013.01)
(58) Field of Classification Search
CPC ............ B60K 15/05; B60K 2015/0576; B60K 2015/053; B60K 2015/0523
(Continued)

(56) References Cited

U.S. PATENT DOCUMENTS 5,772,062 A  6/1998 Gramss
2003/0071047 A1  4/2003 Harada
(Continued)

FOREIGN PATENT DOCUMENTS

CN  1849231 A  10/2006
CN  201856629 U  6/2011
(Continued)

OTHER PUBLICATIONS

PCT, International Search Report and Written Opinion, International Application No. PCT/US2017/026899; dated Jun. 29, 2017, 10 pages.

*Primary Examiner* — Anthony D Stashick
*Assistant Examiner* — James M Van Buskirk
(74) *Attorney, Agent, or Firm* — Thompson Hine LLP

(57) ABSTRACT

A tank flap or charging flap arrangement for a vehicle includes a housing body and a tank flap or charging flap mounted for pivot between a closed position and an open position by means of an actuating arrangement. A locking device releasably locks the flap in the closed position. The actuating arrangement includes a pivot arm mounted pivotably at a first end on the housing body and connected pivotably at a second end to the flap and a control lever connected pivotably at a first end to the flap. Pivot axes of the pivotable connections of pivot arm and control lever to the flap run parallel to and offset laterally from one another. During movement of the flap between the closed and the open position, the control lever is guided at a second end an elongated hole in the pivot arm and in a guide curve of the housing body.

19 Claims, 6 Drawing Sheets

Figure 1:
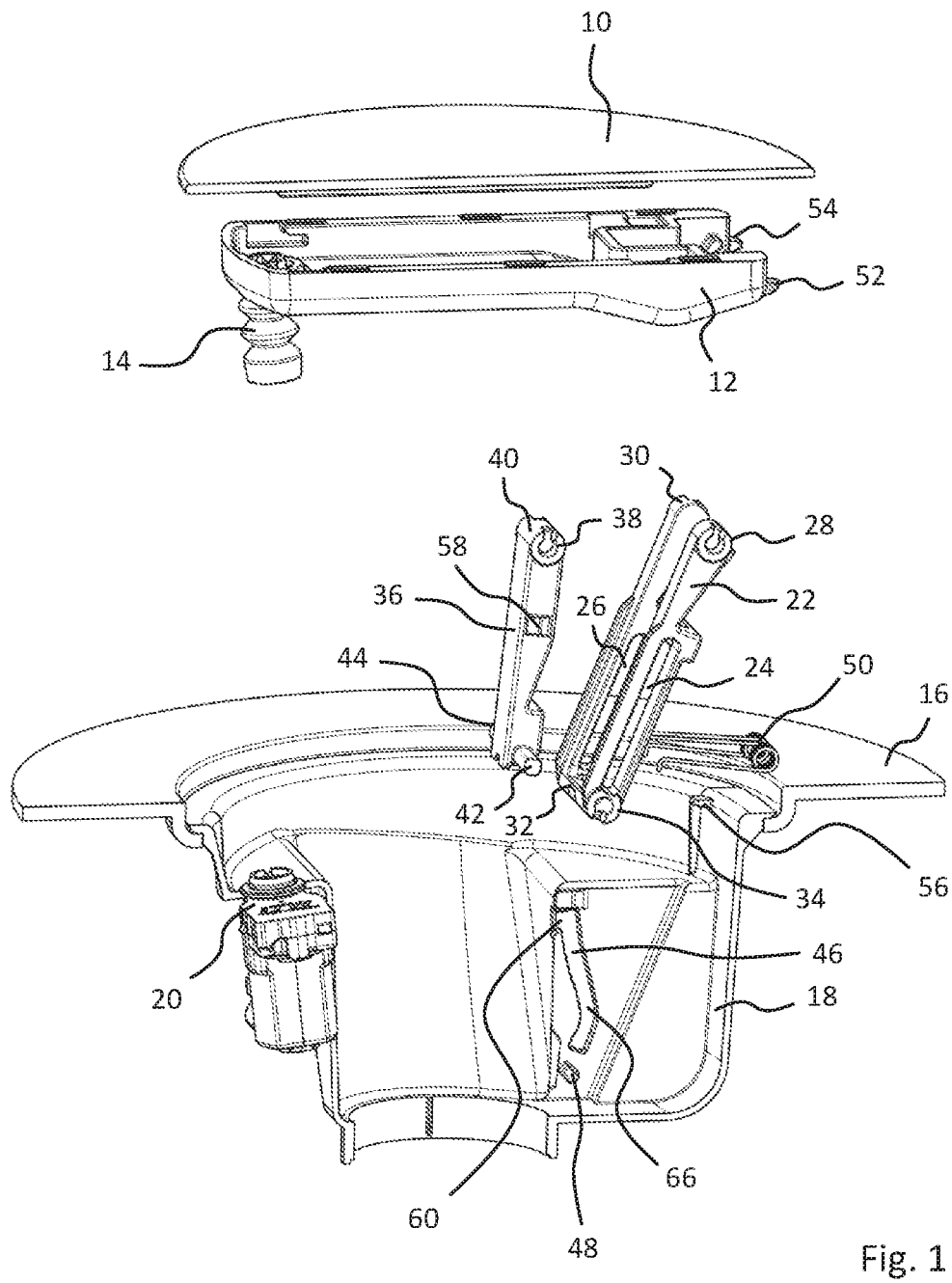

(58) Field of Classification Search
USPC .......................................................... 220/323
See application file for complete search history.

(56) References Cited

U.S. PATENT DOCUMENTS

| | | |
|---|---|---|
| 2007/0103787 A1 | 5/2007 | Baudoux |
| 2009/0218827 A1 | 9/2009 | Meyer |
| 2011/0140477 A1 | 6/2011 | Mihai |
| 2011/0285166 A1 | 11/2011 | Baba |
| 2015/0291024 A1 | 10/2015 | Betzen |

FOREIGN PATENT DOCUMENTS

| | | |
|---|---|---|
| CN | 102278025 A | 12/2011 |
| CN | 205000787 U | 1/2016 |
| DE | 19517705 | 11/1996 |
| DE | 202014002556 | 6/2015 |
| DE | 102015003312 | 9/2015 |

TANK FLAP OR CHARGING FLAP ARRANGEMENT

The invention relates to a tank flap or charging flap arrangement for a vehicle, comprising a housing body and a tank flap or charging flap which is mounted on the housing body so as to be pivotable between a closed position and an open position by means of an actuating arrangement, and comprising a locking device which releasably locks the tank flap or charging flap in the closed position.

Tank flap or charging flap arrangements serve for closing and opening up refueling or charging openings of vehicles, in particular cars. Tank flap or charging flap arrangements of this type are generally mounted pivotably on a housing body inserted into a body opening of the car. Various actuating arrangements for moving the flap between a closed and an open position are known. Various locking devices for releasably locking the flap in the closed position are also known. For example, locking devices with push-push kinematics are known. By pushing in the flap in the closed position, the flap is unlocked by means of the push-push kinematics and pivots open partially or completely. If the flap partially pivots open, it can be grasped manually and completely pivoted open. When the flap is closed, the push-push kinematics lock said flap in the closed position again.

Known actuating arrangements comprise a hinge arm which holds the tank flap or charging flap and via which the flap can be pivoted between the closed and the open position. Actuating arrangements of this type are difficult to fit since the actual refueling device, for example a capless fueling system, generally already has to be fitted in the body opening before the installation of the flap with the hinge arm. The body cutout provided for the tank flap for charging flap arrangement is generally intended to be as small as possible. Therefore, tank flaps or charging flaps with hinge arms have to be pivoted into the body opening in a complicated manner. In particular goose neck-shaped hinge arms are known. However, these are of complex construction and, for example, are difficult to produce in a plastics injection molding process because of the complicated demolding. Also, a comparatively large amount of material and a considerable construction space in the car are required. Furthermore, the tank flap or charging flap and therefore the body cutout are of a considerable size since tank flaps or charging flaps with such hinge arm boxes permit only a limited opening angle for the tank flap or charging flap of at maximum 90° because of the design. The accessibility to the filling or charging opening is therefore made difficult, and the construction space requirement is correspondingly increased further. At the same time, in the event of overstressing of the flap in the opening direction, striking against the surrounding body and therefore damage may occur.

In order to solve these problems, DE 195 17 705 C2 proposes a tank housing with a tank cover which is mounted at one end on the housing body so as to be pivotable by means of a lever joint arrangement in the interior of the housing body, wherein the coupling point of the lever joint arrangement to the tank flap executes a limited movement during the adjustment of the tank flap in the direction of housing-side locking and latching means and in the opposite direction thereto. A hinge arm in the vicinity of the bottom of the housing body is coupled pivotably in the interior of the housing body, and the tank cover is coupled to the outer end of said hinge arm. In this manner, opening angles of more than 90° can be realized. In addition, a linear installation of the tank flap arrangement in a body opening is possible. The construction space of the tank flap arrangement is smaller than in the above-explained prior art. However, it is disadvantageous that the movement of the tank flap is not always guided in a sufficiently defined manner, and therefore undesirable movements of the tank flap may occur. In addition, this tank flap arrangement cannot readily be combined with customary locking devices having push-push kinematics.

A further tank flap arrangement is known from DE 10 2015 003 312 A1. A slide is provided in this case, said slide being mounted on a tank housing so as to be displaceable in a deployment direction and the tank flap in turn being mounted rotatably on said slide. For opening of the tank flap, the slide is first of all moved in the deployment direction and then the tank flap is pivoted into an open position. However, this tank flap arrangement is complicated both in respect of its design and in respect of its installation. In addition, the kinematics of the tank flap arrangement during its opening and closing movement require actuation twice by a user and are therefore inconvenient.

Starting from the explained prior art, the invention is based on the object of providing a tank flap or charging flap arrangement of the type mentioned at the beginning which is designed and fittable in a simple manner, takes up little construction space and ensures a reliable defined control of the flap movement at all times with a high degree of convenience for a user.

The invention achieves this object by the subject matter of independent claim 1. Advantageous refinements are found in the dependent claims, the description and the figures.

For a tank flap or charging flap arrangement of the type mentioned at the beginning, the invention achieves the object in that the actuating arrangement comprises a pivot arm which is mounted pivotably at a first end on the housing body and is connected pivotably at a second end to the tank flap or charging flap, and in that the actuating arrangement furthermore comprises a control lever which is likewise connected pivotably at a first end to the tank flap or charging flap, wherein the pivot axes of the pivotable connection of pivot arm and control lever to the tank flap or charging flap run parallel to and offset laterally from one another, and wherein, during a movement of the tank flap or charging flap between the closed and the open position, the control lever is guided at a second end firstly in at least one elongated hole in the pivot arm and secondly in at least one guide curve of the housing body.

The tank flap or charging flap arrangement according to the invention is used for the refueling or electrical charging of a vehicle, in particular a car with an internal combustion engine and/or electric drive. It can be used for the refueling with any operating substance, for example fuel or a urea solution (AdBlue). The pivot arm and/or the control lever of the actuating arrangement according to the invention can be composed of a plastic. The housing body can likewise be composed of plastic. The same applies to a carrier plate optionally carrying the tank flap or charging flap. The tank flap or charging flap itself can be composed, for example, of a plastic or a metal material.

The actuating arrangement of the tank flap or charging flap arrangement according to the invention comprises a pivot arm and a control lever instead of an in particular goose neck-shaped hinge arm. The pivot arm is mounted pivotably at a first end on the housing body and is connected pivotably at a second end to the tank flap or charging flap. The control lever is likewise connected pivotably at a first end to the tank flap or charging flap. The pivot arm and the control lever can be held here directly on the tank flap or charging flap or, for example, can be connected to a carrier plate carrying the tank flap or charging flap and can therefore be indirectly connected to the flap. The pivot axes of the control lever and of the pivot arm, in particular all of the pivot axes of the control lever and of the pivot arm, run parallel to one another. The pivot axes of the pivotable connection of the pivot arm and of the control lever to the tank flap or charging flap are offset laterally from one another here. In particular, the pivotable connection of the control lever to the tank flap or charging flap or to a carrier plate carrying said flap is arranged closer to the center of the tank flap or charging flap than the pivotable connection of the pivot arm. During a movement of the tank flap or charging flap between its closed and its open position, the control lever is guided at its second end firstly in at least one elongated hole in the pivot arm and secondly in at least one guide curve of the housing body. The at least one guide curve can be formed in particular by at least one guide groove formed in the housing body.

Various advantages are achieved by this control of the movement of the tank flap or charging flap between its closed and its open position, the control taking place, according to the invention, in the manner of a slotted guide mechanism. As mentioned, according to the invention, the pivot arm and the control lever replace the in particular goose neck-shaped hinge arm provided in the prior art explained at the beginning. As a result, the design and the installation of the tank flap or charging flap arrangement according to the invention are simple and the tank flap or charging flap arrangement requires little construction space. In contrast to a goose neck-shaped hinge arm, even in the case of a refueling or charging device which is already fitted in the body opening, for example a capless refueling system, the tank flap or charging flap arrangement according to the invention can be introduced linearly into the body opening and fitted in the latter. As a result, in comparison to the prior art, the refueling or charging devices can move closer to the outer skin of the vehicle. A lesser construction space depth is therefore required in the vehicle. In contrast to the prior art, the tank flap or charging flap and therefore the body cutout can become smaller. This leads in turn to the tank flap or charging flap in the open state protruding less far from the vehicle. The risk of a collision with the surroundings is therefore reduced and, in an overload situation, there is a smaller lever action and therefore a lower risk of damage. The components of the actuating arrangement according to the invention can be produced more simply. In particular, the demolding in a plastics injection molding process is simpler than in the case of a goose neck-shaped hinge arm. The cost can be reduced. At the same time, a reliably guided movement of the tank flap or charging flap between its open and its closed position is ensured at all times, and locking devices with push-push kinematics can easily be integrated in the tank flap or charging flap arrangement according to the invention.

The actuating arrangement can furthermore comprise a spring element which prestresses the pivot arm and the control lever into the open position of the tank flap or charging flap. The spring element can be a helical spring which is connected on one side to the housing body and on the other side to the pivot arm and to the control lever, for example a double helical spring. The spring element can consist of a metal material. It can firstly be hooked or clipped into the pivot arm and the control lever and secondly into the housing body. The spring element prestresses the pivot arm and the control lever in such a manner that they move the tank flap or charging flap at least partially, preferably completely into the open position after release of the locking device. If the tank flap or charging flap is closed again manually, the spring element is correspondingly prestressed again.

According to a further refinement, the at least one guide curve of the housing body can be designed in such a manner that the tank flap or charging flap at the beginning of its movement from the closed position into the open position, first of all executes a combined pivoting movement and translatory movement in a lateral direction. The guide curve controls the movement of control lever and pivot arm and therefore of the tank flap or charging flap. In this refinement, the translatory lateral movement takes place in particular in the direction of that end of the tank flap or charging flap which pivots open from the housing body, and therefore away from the opposite opening edge of the housing body or of the body opening. In order to produce this translatory movement, the at least one guide curve, in particular the at least one guide groove, can change its direction at least once, for example can have a curvature or a kink, and therefore the second end of the control lever, which end is guided in the at least one guide curve, likewise undergoes this change in direction. The tank flap or charging flap, when pivoting open, can then dip with its end opposite the pivoting-open end into the housing body without a collision with the surrounding body occurring. In particular, as a result, according to the invention the opening angle of the tank flap or charging flap in the open position can be greater than 90°.

Furthermore, locking projections can be formed on the housing body, which locking projections, in the closed position of the tank flap or charging flap, are engaged behind by corresponding locking projections of the tank flap or charging flap or of a carrier plate carrying the tank flap or charging flap. The locking projections ensure that the tank flap or charging flap in the closed position is hooked on the housing body and therefore an exactly predetermined positioning of the flap in the closed position is ensured. In particular, the flap in the closed position is then positioned precisely flush with the surface of the surrounding body skin of the vehicle. The above-explained lateral movement of the tank flap or charging flap at the beginning of the pivoting-open operation ensures here that the locking projections are released from one another over the course of the opening of the tank flap or charging flap, and therefore the locking projections are released from one another.

According to a further refinement, it can be provided that the pivot arm has, at its first end, at least one pivot hook which engages around at least one pivot bearing formed on the housing body, and that the pivot arm has, at its second end, at least one pivot hook which engages around at least one pivot bearing which is formed on the tank flap or charging flap or on a carrier plate carrying the tank flap or charging flap. It is also possible for the pivot arm to comprise, at its first end and/or at its second end, for example two such pivot hooks in each case. Furthermore, the control lever can have, at its first end, at least one pivot hook which engages around at least one pivot bearing formed on the tank flap or charging flap or on a carrier plate carrying the tank flap or charging flap. The control lever in turn can also have, at its first end, for example two such pivot hooks. The pivot hooks can be, for example, C-shaped, i.e. can form pivot claws. The pivot bearings can be of cylindrical design. It is possible, for example, for in each case two pivot hooks to engage around a common pivot bearing. However, it is also conceivable for the pivot hooks to each engage around a dedicated pivot bearing, for example a pivot pin in each case. Of course, any desired combinations in this respect are also conceivable. The pivot hooks engage around the pivot bearings in such a manner that the pivot hooks are rotatable relative to the pivot bearings. For the installation, the pivot axes can be pressed onto the pivot bearings in a simple manner such that they engage around the pivot bearings by snapping. This gives rise to a particularly simple installation.

The pivot arm and/or the control lever can be formed integrally, for example can be produced in a plastics injection molding process. The integral production takes place here in a manner including the bearing portions, for example any pivot hooks, control pins, etc. The housing body and/or a carrier plate for the tank flap or charging flap can also be formed integrally, for example likewise in a plastics injection molding process, in turn including the bearing portions, for example any pivot bearings, etc. This results in particularly simple production and installation since no separate axis components have to be produced and fitted.

According to a further refinement, it can be provided that the pivot arm has a U shape, wherein the free ends of the limbs of the U shape are connected pivotably to the tank flap or charging flap, and the connecting portion of the U shape, which connecting portion connects the limbs, is mounted pivotably on the housing body, and wherein a respective elongated hole is formed in the two limbs of the U shape. Any pivot hooks can then be formed at the free ends of the limbs or on the connecting portion of the limbs of the U-shaped pivot arm.

The control lever can be accommodated between the limbs of the U-shaped pivot arm, wherein a respective control pin is formed on the outer sides of the control lever, which outer sides face the limbs, wherein, during a movement of the tank flap or charging flap between the closed and the open position, the control pins are each guided in one of the elongated holes in the pivot arm. For example, cylindrical control pins can be integrally formed on the control lever. In this refinement, the control lever is arranged movably between the limbs of the pivot arm. In the completely open position of the tank flap or charging flap, the control lever which is, for example of cuboidal design can lie flush between the limbs of the pivot arm.

According to a further refinement, two guide curves, in particular guide grooves, can be formed in the housing body, wherein, during a movement of the tank flap or charging flap between the closed and the open position, the control pins are furthermore each guided in one of the guide curves of the housing body. The control pins can then protrude through the elongated holes in the limbs of the pivot arm into the guide curves. As a result, the movement predetermined by the guide curves serving as a slotted guide mechanism is reliably transmitted to the control lever and to the pivot arm and therefore to the tank flap or charging flap.

According to a further refinement, it can be provided that at least one guide ramp is formed in each case on the outer sides of the control lever, which outer sides face the inner sides of the limbs of the U-shaped pivot arm, wherein the guide ramps bear against the facing inner sides of the limbs of the U-shaped pivot arm in the open position of the tank flap or charging flap. In the completely open position of the tank flap or charging flap, the guide ramps can bear with a slight excess size, i.e. under pressure, against the inner sides of the limbs. By means of this slight clamping of the control lever between the limbs of the pivot arm, movement play of the flap that is otherwise possible in the case of the slotted guide control according to the invention is firstly reliably prevented in the completely open position. By this means, in turn, a particularly high-quality impression is produced for a user. In addition, when the control lever enters the pivot arm, this refinement leads to braking of the pivoting movement even before the completely open position is reached. This prevents an undesirable "rebound effect" in which the flap initially slightly oscillates in the completely open position. In addition, this refinement makes it possible to optionally dispense with a separate damper component for damping the opening movement.

As already explained, the locking device of the tank flap or charging flap arrangement according to the invention can have push-push kinematics. A slide of the push-push kinematics can then be arranged on the tank flap or charging flap or on a carrier plate holding the tank flap or charging flap, said slide, in the closed position, being accommodated in a locking manner in a slide receptacle of the push-push kinematics, the slide receptacle being formed on the housing body. Such locking devices with push-push kinematics are known per se and, differently than in the prior art explained at the beginning, can easily be combined with the tank flap or charging flap arrangement according to the invention because of the control kinematics according to the invention of the actuating arrangement.

As likewise already explained in principle, it is possible for the actuating arrangement, when preassembled on the tank flap or charging flap, to be inserted by an exclusively translatory movement into the housing body and therefore to be mounted in the latter. For the installation, first of all the pivot arm can be connected to the control lever, and the pivot arm and the control lever can be connected, for example, to a carrier plate carrying the tank flap or charging flap. Subsequently, a spring element of the actuating arrangement can be connected to the pivot arm and to the control lever. A locking device, for example with push-push kinematics on the tank flap or charging flap or on a carrier plate and the housing body can be installed beforehand or subsequently. The tank flap or charging flap with the actuating arrangement can subsequently be inserted by a purely translatory movement into the housing body and mounted on the latter, in particular solely by insertion into the housing body, wherein the pivot arm, for example one or more pivot hooks at the first end of the pivot arm, come into engagement in a latching manner with one or more pivot bearings formed on the housing body. At the same time, the control lever comes into engagement with the at least one guide curve in the housing body. Such an installation is particularly simple.

Figure 2:
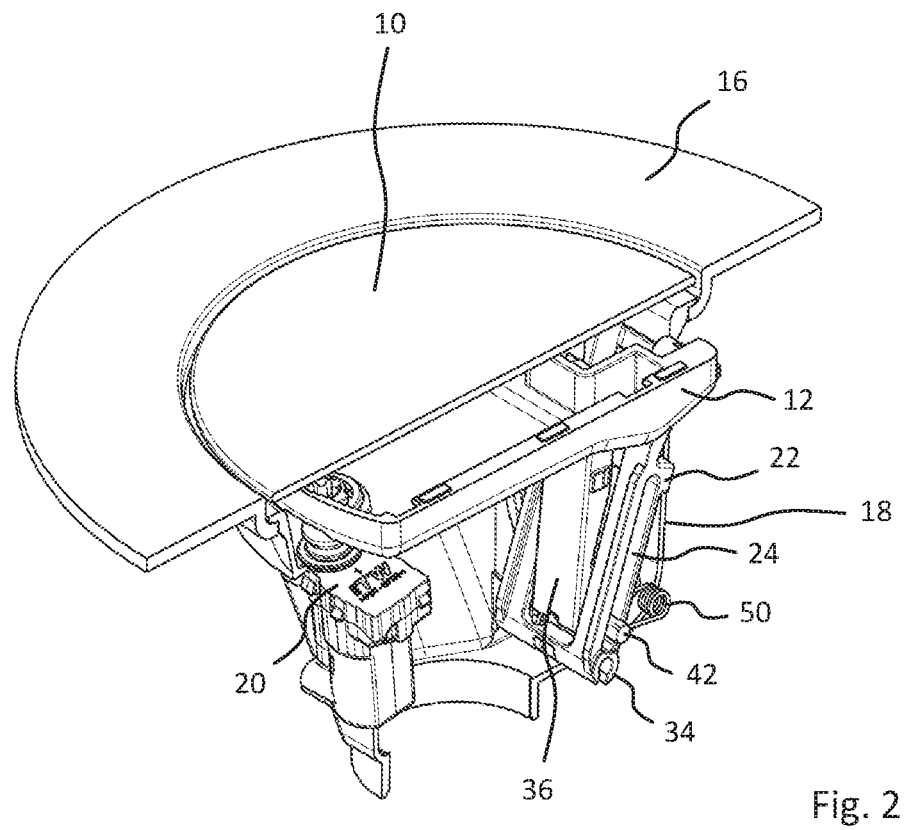
Figure 3:
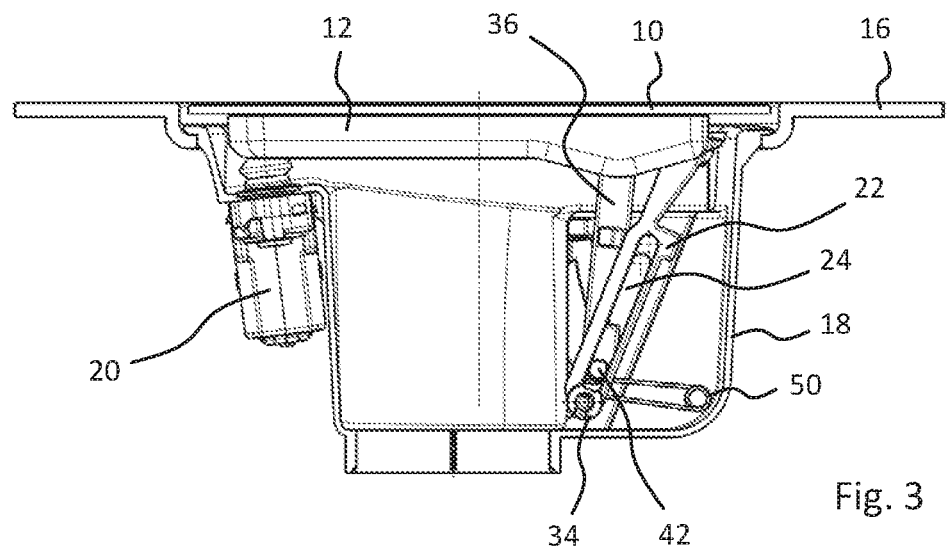
Figure 4:
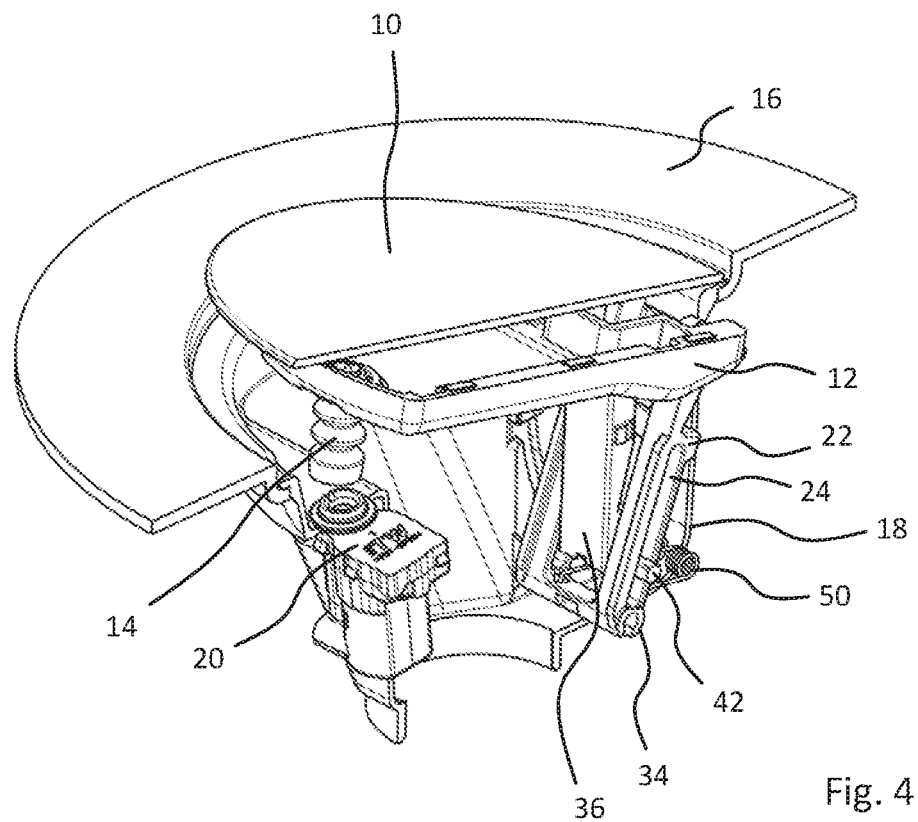
Figure 5:
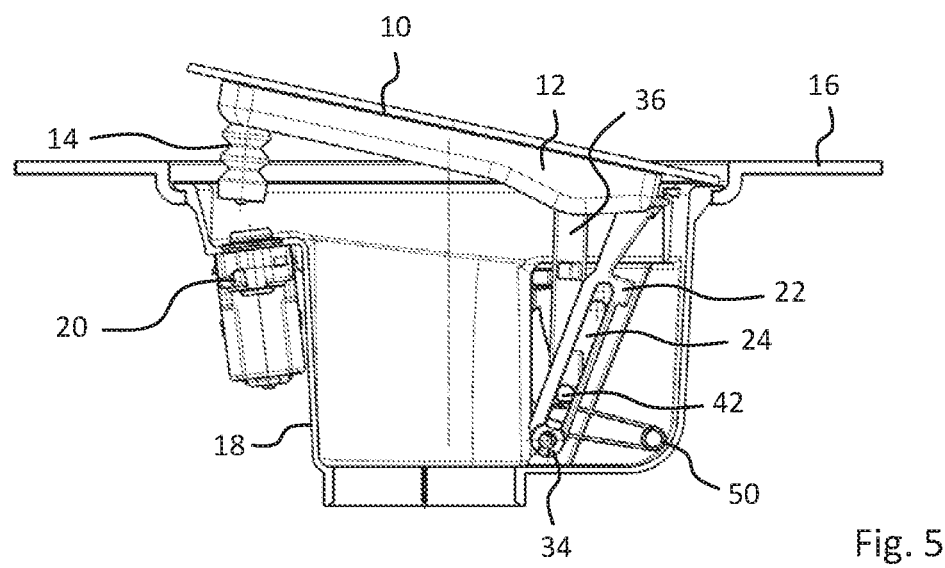
Figure 6:
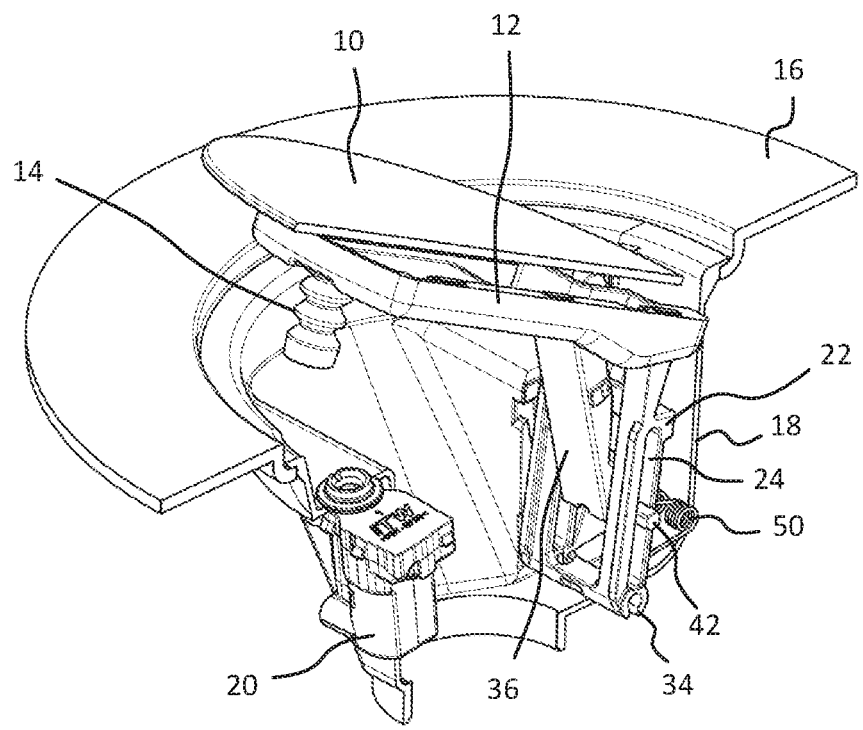
Figure 7:
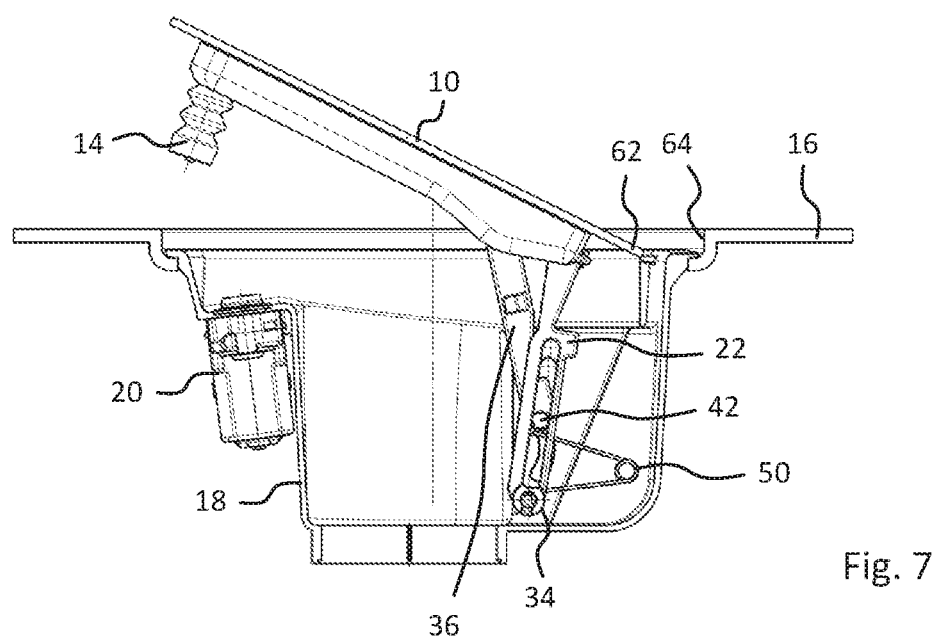
Figure 8:
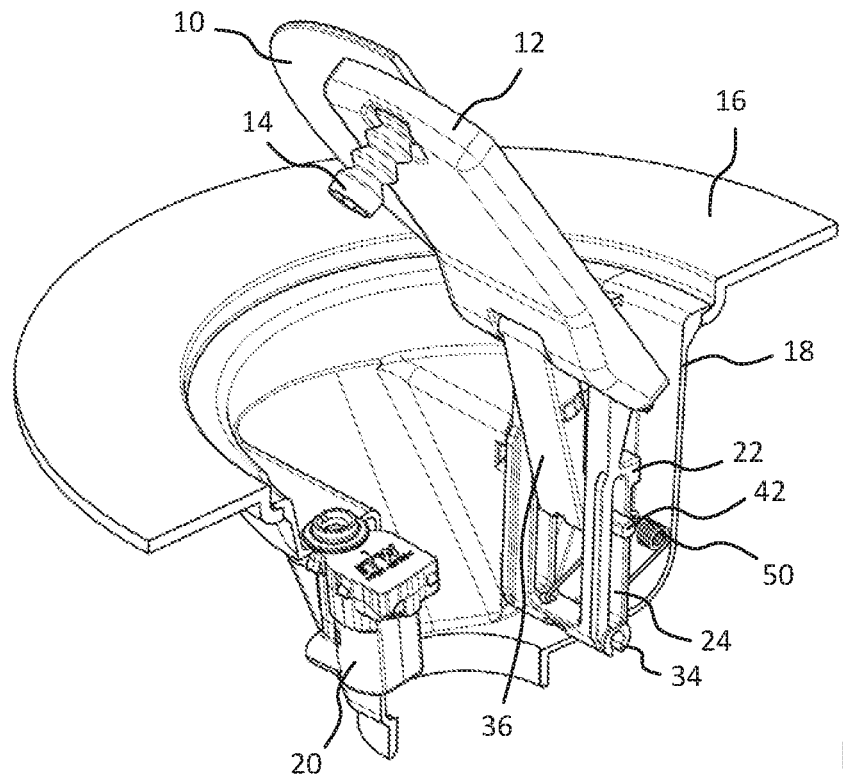
Figure 9:
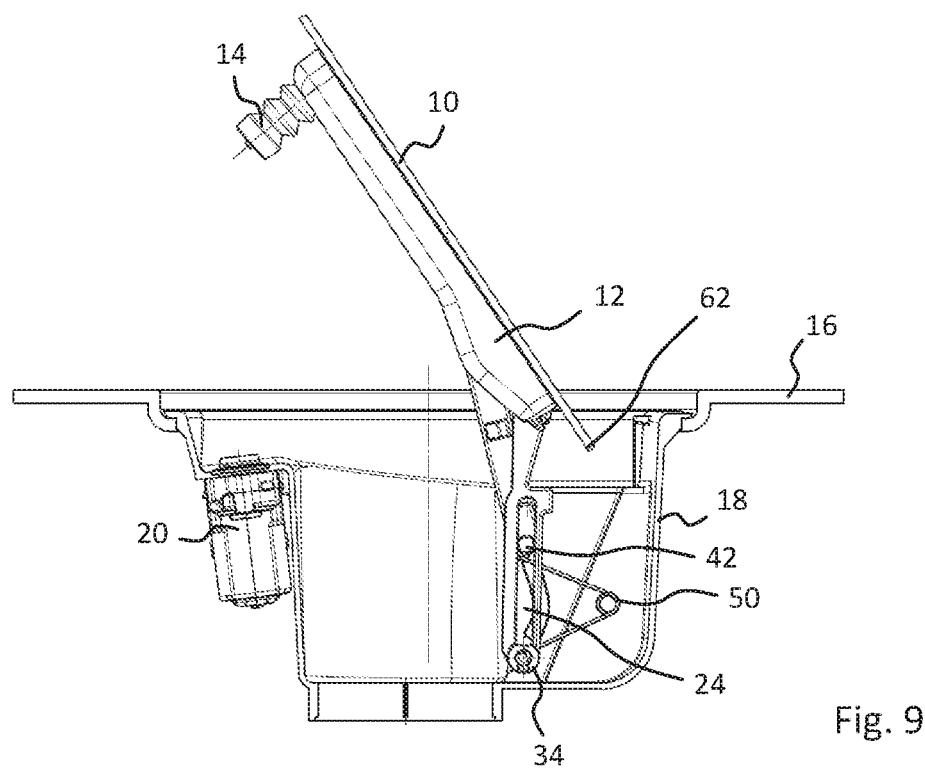
Figure 10:
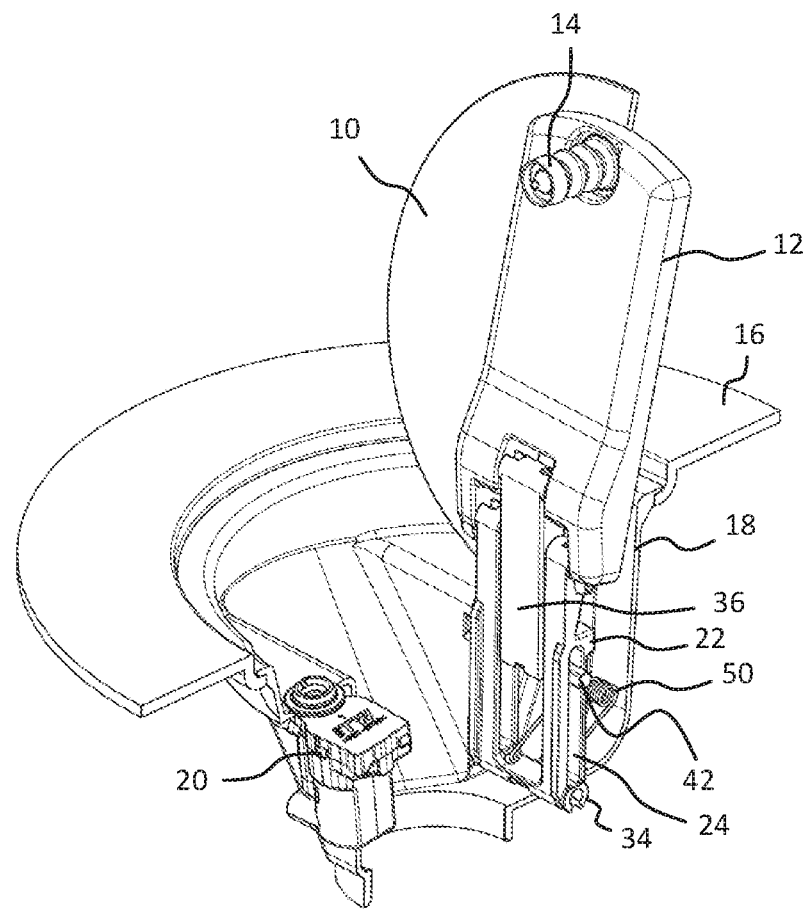
Figure 11:
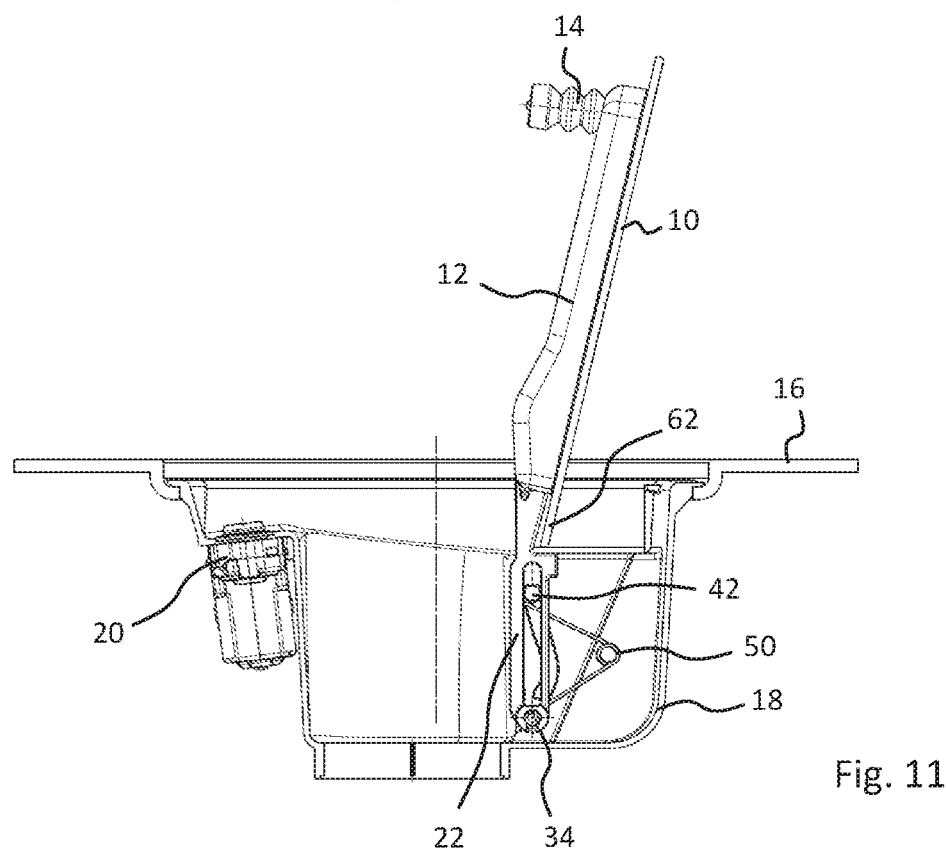

An exemplary embodiment of the invention is explained in more detail below with reference to figures, in which, schematically:

FIG. 1 shows a partially sectioned perspective exploded illustration of a tank flap or charging flap arrangement according to the invention, FIG. 2 shows a partially sectioned perspective view of the tank flap or charging flap arrangement from FIG. 1 in the fitted state in a closed position, FIG. 3 shows a side view of the illustration from FIG. 2, FIG. 4 shows a partially sectioned perspective view of the tank flap or charging flap arrangement from FIG. 2 in a partially open position, FIG. 5 shows a side view of the illustration from FIG. 4, FIG. 6 shows a partially sectioned perspective view of the tank flap or charging flap arrangement from FIG. 2 in a further open position, FIG. 7 shows a side view of the illustration from FIG. 6, FIG. 8 shows a partially sectioned perspective view of the tank flap or charging flap arrangement from FIG. 2 in a further open position, FIG. 9 shows a side view of the illustration from FIG. 8, FIG. 10 shows a partially sectioned perspective view of the tank flap or charging flap arrangement in FIG. 2 in a completely open position, and FIG. 11 shows a side view of the illustration in FIG. 10.

Unless indicated otherwise, the same reference numbers denote the same objects in the figures.

The tank flap or charging flap arrangement according to the invention as shown in the figures for a vehicle, in particular a car, comprises a tank flap or charging flap 10 which, in the example shown, is held on a carrier plate 12. A slide of a locking device with push-push kinematics is arranged on the carrier plate 12, said slide being surrounded by an expansion bellows 14, for example made of plastic or rubber. In the example illustrated, the tank flap or charging flap 10 has a circular shape. For reasons of better comprehensibility, only approximately half of the tank flap or charging flap 10 is illustrated. A body portion of the vehicle is shown at the reference sign 16. A corresponding circular opening into which a housing body 18 of the tank flap or charging flap arrangement is inserted is formed in the body portion 16. For reasons of better comprehensibility, the housing body is illustrated cut open. A slide receptacle 20 is arranged in the housing body 18. In the closed state of the tank flap or charging flap 10 that is illustrated in FIGS. 2 and 3, the slide of the locking device is accommodated in a locking manner in the slide receptacle 20.

An actuating arrangement of the tank flap or charging flap arrangement comprises a U-shaped pivot arm 22. A respective elongated hole 24, 26 is formed in the limbs of the U-shaped pivot arm 22. A respective C-shaped pivot hook 28, 30 is formed at the free ends of the limbs of the pivot arm 22. Two C-shaped pivot hooks, of which one can be seen in the figure at the reference sign 34, are likewise formed on the opposite connecting portion 32 of the limbs of the pivot arm 22. The other pivot hook is formed at the opposite end of the connecting portion 32. The actuating arrangement furthermore comprises a control lever 36 which is accommodated in the fitted state between the limbs of the pivot arm 22. The control lever 36 likewise has two C-shaped pivot hooks 38, 40 at a first end and two mutually opposite control pins 42, 44 at an opposite second end. In the fitted state, the control pins 42, 44 are guided in the elongated holes 24, 26. The control pins 42, 44 project here through the elongated holes 24, 26 and are in engagement with a respective guide curve or guide groove which is formed in the housing body 18 and of which one is shown at the reference sign 46 in the figures. In the fitted state, the pivot hooks 28, 30 of the pivot arm 22 engage in a latching manner in corresponding pivot pins on the carrier plate 12. In the fitted state, the pivot hooks 38, 40 of the control lever 36 also engage in a latching manner in corresponding pivot pins on the carrier plate 12. The resultantly formed pivot axes of pivot arm 22 and control lever 36 on the carrier plate 12 run parallel to and offset laterally from one another. In particular, the pivot axis of the control lever 36 is offset laterally to the left on the carrier plate 12 in FIG. 1 in relation to the pivot axis of the pivot arm 22. In the fitted state, the pivot hooks 34 of the pivot arm 22, which pivot hooks are formed on the connecting portion 32, engage in a latching manner in corresponding pivot pins on the housing body 18, of which pivot pins one can be seen at the reference sign 48 in the figures. Furthermore, a spring, a double helical spring in the example illustrated, can be seen at the reference sign 50, said spring, in the fitted state, being connected on one side to the housing body 18 and on the other side to the pivot arm 22 and the control lever 36. Of course, other types of spring are also conceivable. The spring 50 prestresses the pivot arm 22 and the control lever 36 into the open position of the tank flap or charging flap 10.

Furthermore, two locking projections 52, 54 are formed on the carrier plate 12 and, in the closed state of the tank flap or charging flap 10, engage behind corresponding locking projections on the housing body 18, of which one can be seen at the reference sign 56 in the figures. In addition, a guide ramp is formed in each case on the outer sides of the control lever 36, which outer sides face the inner sides of the limbs of the pivot arm 22, of which guide ramps one can in turn be seen at the reference sign 58 in the figures.

The pivot arm 22, the control lever 36, the housing body 18 and the carrier plate 12 can in each case be produced integrally from a plastic, for example in a plastics injection molding process. The tank flap or charging flap 10 can be composed, for example, of a metal material.

For the installation of the tank flap or charging flap arrangement according to the invention on the body part 16 or on the housing body 18 first of all inserted therein, first of all the pivot arm 22 and the control lever 36 are connected to each other outside the housing body 18 by the control pins 42, 44 being inserted into the elongated holes 24, 26, and the pivot arm 22 and the control lever 36 being connected to the carrier plate 12 and therefore indirectly to the tank flap or charging flap 10 carried by the latter. The spring 50 is then connected on one side to the pivot arm 22 and on the other side to the control lever 36, for example is hooked into suitable receptacles. The locking device, in particular the slide of the push-push kinematics including the expansion bellows 14, and also the slide receptacle 20 can be fastened beforehand or subsequently to the carrier plate 12 or to the housing body 18. Subsequently, the tank flap or charging flap 10 together with the carrier plate 12 and pivot arm 22, control lever 36 or spring 50 fastened thereto is inserted into the housing body 18 by an exclusively translatory movement. In the process the control pins 42, 44 enter the guide grooves 46 via an inlet opening, which can be seen at the reference sign 60 in FIG. 1, and the pivot hooks 34 on the connecting portion 32 enter into latching engagement with the pivot pins 48 formed on the housing body 18. The spring 50 is connected to the housing body 18, for example is hooked into a suitable receptacle. In this manner, a particularly simple installation of the tank flap or charging flap arrangement is possible, with it not being necessary to fit any separate axis components or the like.

The movement of the tank flap or charging flap 10 from the closed position into the completely open position and vice versa will be explained with reference to FIGS. 2 to 11. As can be seen in FIGS. 2 and 3, the tank flap or charging flap 10 in the closed state sits flush in the opening in the body portion 16. The tank flap or charging flap 10 is locked in this state by the push-push kinematics of the locking device. If the tank flap or charging flap 10 in FIG. 3 is pressed in downward, the push-push kinematics unlock and the tank flap or charging flap 10 begins to open, driven by the spring 50. The slide of the push-push kinematics thereby emerges from the slide receptacle 20, as can be seen in particular in FIGS. 4 and 5. Over the course of the further movement, driven by the spring 50, into the completely open position, the tank flap or charging flap 10, controlled by the actuating arrangement, in particular by the interaction of pivot arms 22, control levers 36 and guide grooves 46, carries out a combined pivoting movement and lateral movement. As can be seen in particular from a comparison of FIGS. 5 and 7, that end 62 of the tank flap or the charging flap 10 which is opposite the end which pivots open is moved away from the opening edge 64, facing said end 62, of the body portion 16, i.e. to the left in FIGS. 5 and 7. In order to realize this movement, the guide grooves 46 have a change in direction brought about by a curvature 66 (see FIG. 1).

By means of the translatory movement of the tank flap or charging flap 10, the locking projections 52, 54 and 56 which are in engagement with one another in the closed position are released from one another. In addition, by means of the additional translatory movement, over the course of the further opening movement, the tank flap or charging flap 10 can enter at its end 62 into a depression in the housing body 18, as can be seen in particular in FIGS. 8, 9 and 10, 11. As can furthermore be seen in FIGS. 10 and 11, the opening angle of the tank flap or charging flap 10 in the completely open state is greater than 90° in relation to the plane defined by the body portion 16. As can also be seen from FIGS. 10 and 11, in this fully open state, the control lever 36 lies flush between the limbs of the pivot arm 22. As a result, access to the housing body 18, in particular to a refueling or charging device arranged therein, is easily possible even in the case of the tank flap or charging flap 10 which is comparatively small according to the invention. In addition, in the completely open position of the tank flap or charging flap 10 that is shown in FIGS. 10 and 11, the guide ramps 58 formed on the outer sides of the control lever 36 lie with a slight excess size against the inner sides of the limbs of the pivot arm 22. The control lever 36 is therefore clamped between the limbs of the pivot arm 22.

From the completely open position shown in FIGS. 10 and 11, the tank flap or charging flap 10 can subsequently be moved manually again counter to the prestressing of the spring 50 into the closed position shown in FIGS. 2 and 3, wherein the previously described sequence of movement takes place in the reverse direction. Finally, the slide of the locking device enters the slide receptacle 20 and locks the tank flap or charging flap 10 again in the closed position with the spring 50 correspondingly prestressed.

LIST OF REFERENCE SIGNS

10 Tank flap or charging flap
12 Carrier plate
14 Expansion bellows
16 Body portion
18 Housing body
20 Slide receptacle
22 Pivot arm
24 Elongated hole
26 Elongated hole
28 Pivot hook
30 Pivot hook
32 Connecting portion
34 Pivot hook
36 Control lever
38 Pivot hook
40 Pivot hook
42 Control pin
44 Control pin
46 Guide groove
48 Pivot pin
50 Spring
52 Locking projection
54 Locking projection
56 Locking projection
58 Guide ramp
60 Inlet opening
62 Flap end
64 Opening edge
66 Curvature

The invention claimed is:

1. Tank flap or charging flap arrangement for a vehicle, comprising a housing body (18) and a tank flap or charging flap (10) which is mounted on the housing body (18) so as to be pivotable between a closed position and an open position by means of an actuating arrangement, and comprising a locking device which releasably locks the tank flap or charging flap (10) in the closed position, characterized in that the actuating arrangement comprises a pivot arm (22) which is mounted pivotably at a first end on the housing body (18) and is connected pivotably at a second end to the tank flap or charging flap (10), and in that the actuating arrangement furthermore comprises a control lever (36) which is likewise connected pivotably at a first end to the tank flap or charging flap (10), wherein the pivot axes of the pivotable connection of pivot arm (22) and control lever (36) to the tank flap or charging flap (10) run parallel to and offset laterally from one another, and wherein, during a movement of the tank flap or charging flap (10) between the closed and the open position, the control lever (36) is guided at a second end firstly in at least one elongated hole (24, 26) in the pivot arm (22) and secondly in at least one guide curve (46) of the housing body (18).

2. Tank flap or charging flap arrangement according to claim 1, characterized in that the actuating arrangement furthermore comprises a spring element (50) which prestresses the pivot arm (22) and the control lever (36) into the open position of the tank flap or charging flap (10).

3. Tank flap or charging flap arrangement according to claim 1, characterized in that the at least one guide curve (46) of the housing body (18) is designed in such a manner that the tank flap or charging flap (10), at the beginning of its movement from the closed position into the open position, first of all executes a combined pivoting movement and translatory movement in a lateral direction.

4. Tank flap or charging flap arrangement according to claim 1, characterized in that an opening angle of the tank flap or charging flap (10) in the open position is greater than 90°.

5. Tank flap or charging flap arrangement according to claim 1, characterized in that locking projections (56) on the housing body (18), in the closed position of the tank flap or charging flap (10), are engaged behind by corresponding locking projections (52, 54) of the tank flap or charging flap (10) or of a carrier plate (12) carrying the tank flap or charging flap (10).

6. Tank flap or charging flap arrangement according to claim 1, characterized in that the pivot arm (22) has, at its first end, at least one pivot hook (28, 30) which engages around at least one pivot bearing formed on the housing body (18), and in that the pivot arm (22) has, at its second end, at least one pivot hook (32, 34) which engages around at least one pivot bearing which is formed on the tank flap or charging flap (10) or on a carrier plate (12) carrying the tank flap or charging flap (10).

7. Tank flap or charging flap arrangement according to claim 1, characterized in that the control lever (36) has, at its first end, at least one pivot hook (38, 40) which engage around at least one pivot bearing formed on the tank flap or charging flap (10) or on a carrier plate (12) carrying the tank flap or charging flap (10).

8. Tank flap or charging flap arrangement according to claim 1, characterized in that the pivot arm (22) and/or the control lever (36) are formed integrally.

9. Tank flap or charging flap arrangement according to claim 1, characterized in that the pivot arm (22) has a U shape, wherein the free ends of the limbs of the U shape are connected pivotably to the tank flap or charging flap (10), and the connecting portion (32) of the U shape, which connecting portion connects the limbs, is mounted pivotably on the housing body (18), and wherein a respective elongated hole (24, 26) is formed in the two limbs of the U shape.

10. Tank flap or charging flap arrangement according to claim 9, characterized in that the control lever (36) is accommodated between the limbs of the U-shaped pivot arm (22), wherein a respective control pin (42, 44) is formed on the outer sides of the control lever (36), which outer sides face the limbs, wherein, during a movement of the tank flap or charging flap (10) between the closed and the open position, the control pins (42, 44) are each guided in one of the elongated holes in the pivot arm (22).

11. Tank flap or charging flap arrangement according to claim 10, characterized in that two guide curves (46) are formed in the housing body (18), wherein, during a movement of the tank flap or charging flap (10) between the closed and the open position, the control pins (42, 44) are furthermore each guided in one of the guide curves (46) of the housing body (18).

12. Tank flap or charging flap arrangement according to claim 9, characterized in that at least one guide ramp (58) is formed in each case on the outer sides of the control lever (36), which outer sides face the inner sides of the limbs of the U-shaped pivot arm (22), wherein the guide ramps (58) bear against the facing inner sides of the limbs of the U-shaped pivot arm (22) in the open position of the tank flap or charging flap (10).

13. Tank flap or charging flap arrangement according to claim 1, characterized in that the locking device has push-push kinematics.

14. Tank flap or charging flap arrangement according to claim 13, characterized in that a slide of the push-push kinematics is arranged on the tank flap or charging flap (10) or on a carrier plate (12) holding the tank flap or charging flap (10), said slide, in the closed position, being accommodated in a locking manner in a slide receptacle (20) of the push-push kinematics, the slide receptacle being formed on the housing body (18).

15. Tank flap or charging flap arrangement according to claim 1, characterized in that the actuating arrangement, when preassembled on the tank flap or charging flap (10), can be inserted by an exclusively translatory movement into the housing body (18) and can be mounted on the latter.

16. A flap arrangement for a vehicle, comprising a housing body and a flap which is mounted on the housing body so as to be pivotable between a closed position and an open position by an actuating arrangement, and comprising a locking device which releasably locks the flap in the closed position, wherein the actuating arrangement comprises a pivot arm mounted pivotably about a first pivot axis at a first end on the housing body and connected pivotably about a second pivot axis at a second end to the flap, wherein the actuating arrangement further comprises a control lever connected pivotably about a third pivot axis at a first end to the flap, wherein the first pivot axis, second pivot axis and third pivot axis are parallel to and offset laterally from one another, and wherein, during a movement of the flap between the closed and the open position, the control lever is guided at a second end in at least one elongated hole in the pivot arm and in at least one guide curve of the housing body.

17. The flap arrangement according to claim 15, wherein the actuating arrangement further comprises a spring element which prestresses the pivot arm and the control lever into the open position of the flap.

18. The flap arrangement according to claim 15, wherein the at least one guide curve of the housing body is designed such that the flap, upon beginning its movement from the closed position into the open position, executes a combined pivoting movement and translatory movement in a lateral direction.

19. The flap arrangement according to claim 15, wherein an opening angle of the flap in the open position is greater than 90°.

* * * * *